(12) United States Patent
Morigi

(10) Patent No.: US 6,374,983 B1
(45) Date of Patent: Apr. 23, 2002

(54) CONVEYOR FOR THE SELECTION OF FRUIT

(76) Inventor: Romana Amaducci Morigi, Jaime Roig, 8, 46400 Cullera (Valencia) (ES)

( * ) Notice: Subject to any disclaimer, the term of this patent is extended or adjusted under 35 U.S.C. 154(b) by 0 days.

(21) Appl. No.: 09/606,036

(22) Filed: Jun. 28, 2000

(30) Foreign Application Priority Data

Jun. 29, 1999 (ES) .......................................... 9901702 U

(51) Int. Cl.⁷ .............................................. B65G 47/10
(52) U.S. Cl. ............................ 198/370.07; 198/370.04; 198/385
(58) Field of Search ...................... 198/370.04, 370.07, 198/388, 387; 177/145; 209/593

(56) References Cited

U.S. PATENT DOCUMENTS

| | | | |
|---|---|---|---|
| 5,244,100 A | * | 9/1993 | Regier et al. ........... 209/593 X |
| 5,306,877 A | * | 4/1994 | Tas ......................... 209/593 X |
| 5,626,238 A | | 5/1997 | Blanc ......................... 209/646 |
| 5,677,516 A | | 10/1997 | Leverett ....................... 177/52 |
| 5,988,351 A | * | 11/1999 | Warkentin ............. 198/370.04 |
| 6,079,542 A | * | 6/2000 | Blood ..................... 198/385 X |

FOREIGN PATENT DOCUMENTS

EP 670276 2/1995

* cited by examiner

*Primary Examiner*—James R. Bidwell
(74) *Attorney, Agent, or Firm*—Klauber & Jackson

(57) ABSTRACT

The conveyor comprises a fruit loading station, a weighing station, an unloading station and a center conveyor chain that includes, on each side, an alignment of tiltable supports for receiving fruit pieces one by one, to then deposit the fruit pieces on a plurality of output conveyor belts; under the tiltable supports, there is a plurality of side conveyor chains supporting a plurality of rotating cylindrical elements selected from rollers and discs that are combined alternatively with the tiltable supports; these rotating cylindrical elements make the pieces of fruit rotate to control them.

8 Claims, 4 Drawing Sheets

CONVEYOR FOR THE SELECTION OF FRUIT

OBJECT OF THE INVENTION

The present invention refers to an improved conveyor for selection of fruit that comprises a center conveyor chain that includes, on both sides thereof, two alignments of tiltable supports for receiving one by one pieces of fruit, such as oranges, tomatoes, pears, etc., in order to then automatically deposit them on a plurality of output conveyor belts.

Along the center conveyor chain there is a fruit loading station, a weighing station, as well as a fruit unloading station that unloads the fruit piece by piece in the corresponding output conveyors.

On the other hand, there are two side conveyor chains arranged underneath the two alignments of supports in correspondence with the front part of the center conveyor chain assembly, the loading station being located in said front part.

These side conveyor chains support a plurality of groups of rotating cylindrical elements selected from discs and rollers that are combined alternately with the tiltable supports, in such a way that in the area of combination of the discs and tiltable supports, the different pieces of fruit will rest on the rotating discs making said pieces of fruit rotate for the purpose of controlling them for alignment and optical determination of the qualities (size, color, etc.) thereof.

Along the center chain there is a fruit loading station, a weighing station, as well as a fruit unloading station that unloads the fruit piece by piece in the corresponding output conveyors.

On the other hand, there are two side conveyor chains arranged underneath the two alignments of supports in correspondence with the front part of the center conveyor chain assembly, the loading station being located in said front part.

These side chains support some groups of rotating discs or rollers that are combined alternately with the tiltable supports, in such a way that in the area of combination of the discs and tiltable supports, the different pieces of fruit will rest on the rotating discs making said pieces of fruit rotate for the purpose of controlling them for alignment and optical determination of the qualities (size, color, etc.) thereof.

BACKGROUND OF THE INVENTION

Presently, there are conveyors for the selection of fruit among which there are European patent application EP0670276, as well as U.S. Pat. No. 5,677,516.

In general, these conveyors comprise a plurality of conveyor chains provided with a plurality of unitary fruit sustaining supports, as well as a rotating cylindrical elements mechanism in order to make fruit pieces rotate so as to detect any type of imperfection thereof, in such a way that the pieces of fruit that have any undesired flaw may be removed.

These conveyors also include a fruit loading station, a weighing station, as well as an unloading station where the supports unload the fruit by means of a suitable mechanism that will act on said supports during the movement and advance of the chains without stopping them.

On the other hand, the device of the European patent application uses alternative means in order to carry out the weighing of fruit pieces, while the U.S. patent does not allow the product to drop, but rather launches it.

DESCRIPTION OF THE INVENTION

The improved conveyor for the selection of fruit comprises a wide center conveyor chain where two alignments of a plurality of tiltable supports are coupled on both sides thereof, with insertion of a plurality of intermediate pieces. These tiltable supports are responsible for receiving pieces of fruit, such as apples, oranges, etc., in such a way that during the conveyance of the fruit pieces resting one by one on the tiltable supports, the fruit pieces will pass through a recognition station, a weighing station and finally, an unloading station, where the tiltable supports collapse downward in order to allow the fruit pieces to drop on a plurality of conveyor belts.

In correspondence with the front part of the center conveyor chain assembly, two side conveyor chains established underneath each one of the two alignments of tiltable supports have been provided for. These side conveyor chains also have a plurality of groups of rotating cylindrical elements selected from discs and rollers, which are combined alternately with the tiltable supports in the front part of the center conveyor chain, said front part corresponding to the fruit loading area.

Hence, in this first loading area, each piece of fruit will rest on two consecutive groups of cylindrical elements selected from rollers and discs, at the same time that the corresponding tiltable support is located between them at a slightly lower level. Therefore, during the simultaneous advance of the conveyor chains, the fruit pieces rotate thus allowing to align them and/or determine their qualities optically.

After the common area of the conveyor chains, the fruit pieces continue advancing resting on the tiltable supports of the rear part of the center conveyor chain, the weighing station and the unloading station being located in the rear part of the center conveyor chain. The weighing of the pieces of fruit is done dynamically one by one.

Each one of the tiltable supports maintains its stable position during the conveyance of the fruit pieces thanks to a tiltable lever or latch retained by means of a spring, at the same time that an extension of the tiltable supports abuts against said tiltable lever associated to the respective intermediate piece. When the unloading takes place, the lever tilts by means of an electromagnet, then producing a rotation of the lever overcoming th resistance of the spring, in such a way that the extension of the respective support will cease abutting against the lever and therefore, the tiltable support will collapse downward unloading the corresponding piece of fruit.

The weighing station is located before the unloading station, in such a way that there are a plurality of elongated shoes in this area where the tiltable levers knock in order to release the support of the extensions of the tiltable supports during the weighing time. During this moment, the support assembly with the piece of fruit rests on the weighing device. After the weighing has been carried out, the tiltable lever recovers its initial position by means of the spring, whereby the extensions of the tiltable supports will once again rest on the respective tiltable levers until the unloading station is reached. In the unloading station said tiltable levers or latches will swivel by means of the electromagnets in order to cause the downward collapse of the supports and thus unloading the fruit pieces, as it has been stated above.

The center conveyor chain has great stability due to its width and also due to the guiding during its entire run on a plurality of tubular profiles supported by other profiles with similar characteristics.

After the fruit pieces have been unloaded, the tiltable supports return to their initial position to receive new pieces of fruit. For this purpose, other elongated shoes established in correspondence with the bottom branch of the center conveyor chain where the supports are located in a downward reversed position have been provided for. Hence, since the tiltable levers contact with the respective bottom shoe, the tiltable supports will recover by gravity their initial position because they are released from the tiltable lever, where the extensions of the supports knocked at the inside side thereof.

This new conveyor has a substantially more advantageous and simpler structure and function than the conveyors of the two patents mentioned in the preceding section.

It should be emphasized that the tiltable support is in turn the device or mechanism on which the weighing is carried out and also the one that tilts downward in order to unload the fruit pieces.

Some figures in which the object of the invention has been represented in an illustrative and non-restrictive manner are accompanied hereinafter in order to provide a better understanding of this specification and forming an integral part thereof.

DESCRIPTION OF A PREFERRED EMBODIMENT

Figure 1:
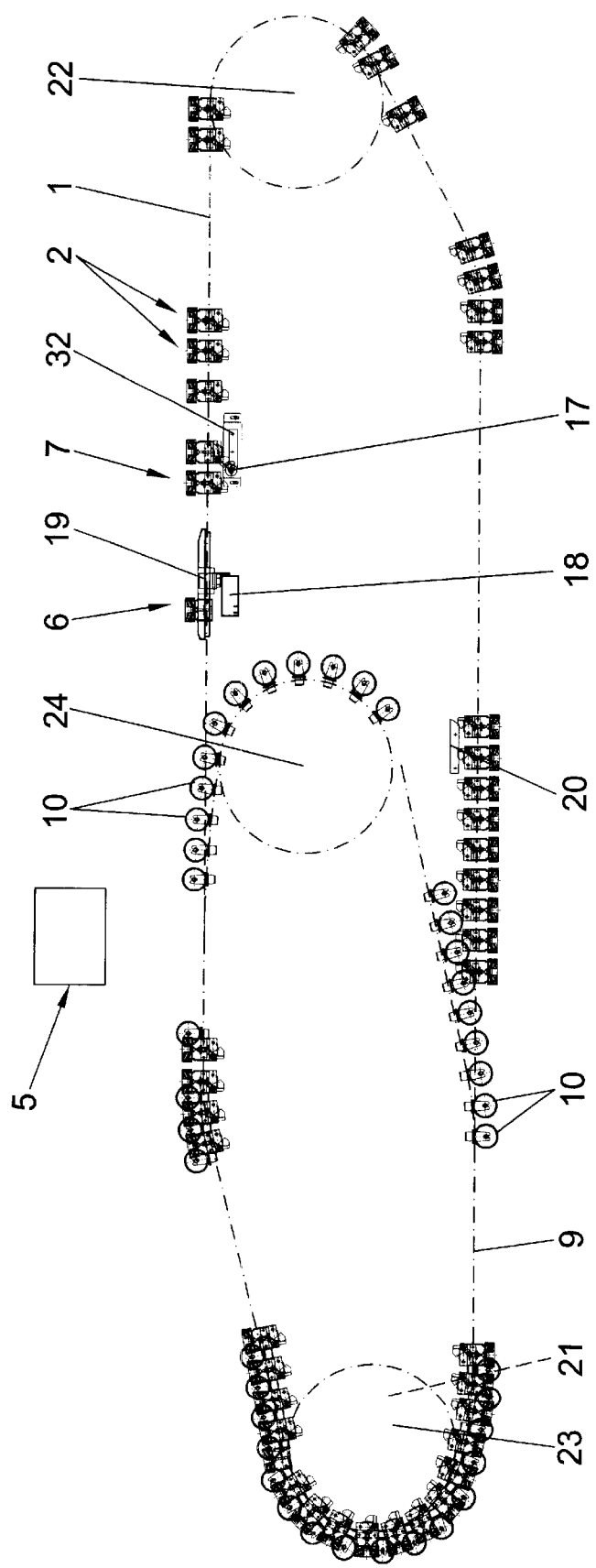
FIG. 1 represents a raised view of the improved conveyor assembly for the selection of fruit, object of the invention. It basically comprises a center conveyor chain and two side conveyor chains arranged underneath and in correspondence with a front part of two alignments of tiltable supports associated to the center conveyor chain on both sides thereof. There is also a fruit loading station, a fruit verification station, a weighing station and an unloading station for unloading onto a plurality of conveyor belts. The side conveyor chains include a plurality of groups of rotating cylindrical elements selected from rollers and discs to rotate the fruit allowing to determine the quality thereof optically.

Making reference to the numbering used in the figures, the improved conveyor for the selection of fruit comprises a loading station, a weighing station (6) provided with a weighing device, a fruit unloading station (7), a plurality of conveyor chains that comprise a plurality of support means and seat means conveying pieces of fruit, the support means and seat means comprising a fruit unloading mechanism.

The improved conveyor for the selection of fruit further comprises a wide center conveyor chain (1) with a front part a rear part, in which two alignments of tiltable supports (2) are coupled with the insertion of a plurality of intermediate pieces (3) that connect integrally to the links of the cited center conveyor chain (1). These tiltable supports (2) are responsible for receiving pieces of fruit (4), such as apples, tomatoes, oranges, etc., in such a way that during the conveyance of the fruit pieces (4) sitting one by one on the tiltable supports (2), the fruit pieces will pass through a recognition station (5), a weighing station (6) and finally through an unloading station (7) where the tiltable supports (2) will collapse downward to allow the fruit pieces (4) to drop on a plurality of output conveyor belts prepared for this purpose and not represented in the figures. Hence, the bottom piece (30) of each one of the tiltable supports (2) is articulated to the respective intermediate piece (3) by means of a shaft (8).

Two side conveyor chains (9) are located in the front part of the center conveyor chain and arranged underneath the two alignments of tiltable supports (2) of the front part of the center conveyor chain (1). Said front part corresponds with the fruit loading area and also with the recognition station (5).

The two side conveyor chains (9) are provided with a plurality of forks (12) to house cross shafts (11) that support a plurality of groups of rotating cylindrical elements selected from rollers and discs (10). The groups of cylindrical elements selected from rollers and discs (10) are alternately combined with the tiltable supports (2).

In the initial loading area, each piece of fruit (4) may rest on two consecutive groups of cylindrical elements selected from rollers and discs (10), the respective tiltable supports (2) established at a lower level with respect to the groups of rotating cylindrical elements (10) between which the tiltable supports (2) are located.

Hence, during the simultaneous and compatible advance of the conveyor chains (1) and (9), the pieces of fruit (4) will rotate allowing to examine them on the outside to align them and determine optically the qualities, such as size, color, etc., thereof.

After the front part of the center conveyor chain (1) where the center conveyor chain (1) and side conveyor chains (9) are combined, the fruit pieces (4) continue advancing now resting on the tiltable supports (2) of the rear part of the center conveyor chain (1), the weighing station (6) and then the unloading station (7) being located in this rear part.

The weighing of the pieces of fruit (4) is done one by one dynamically along with the tiltable supports (2), in other words, the center conveyor chain (1) assembly does not stop at any moment during the weighing, nor do the other two side conveyor chains (9).

The unloading of the fruit (4) is produced simultaneously with the movement of the center conveyor chain (1) and the side conveyor chains (9).

The tiltable supports (2) maintain their stable position during the conveyance of the fruit pieces thanks to a tiltable lever or latch (13) coupled to the intermediate pieces (3) by means of a fastening element, such as a screw (14) or the like. A spring (15) that maintains the tiltable lever (13) in a stable inoperative position also couples in this fastening element. The tiltable supports (2) abut against said lever (13)

by means of an integral bottom extension (16) of the cited tiltable supports (2) in this inoperative stable position.

During unloading, the latch (13) tilts by means of an electromagnet (17) an angular space making the latch (13) rotate overcoming the resistance of the spring (15), in such a way that the bottom extension (16) of the respective support (2) ceases abutting against the top part of the latch (13) and therefore, the tiltable support (2) collapses downward by gravity unloading the piece of fruit (4) towards the output conveyor belts.

Figure 2:
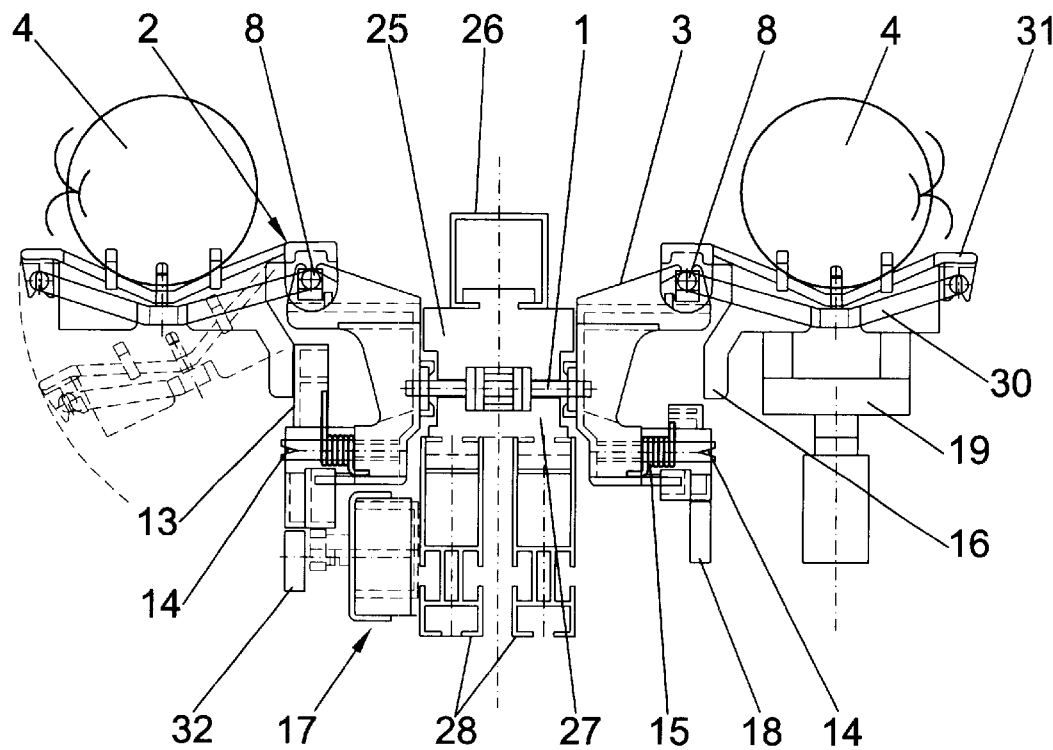
FIG. 2 represents a cross-section view of the center conveyor chain assembly. The weighing station and a part of the unloading mechanism are essentially shown.
Figure 3:
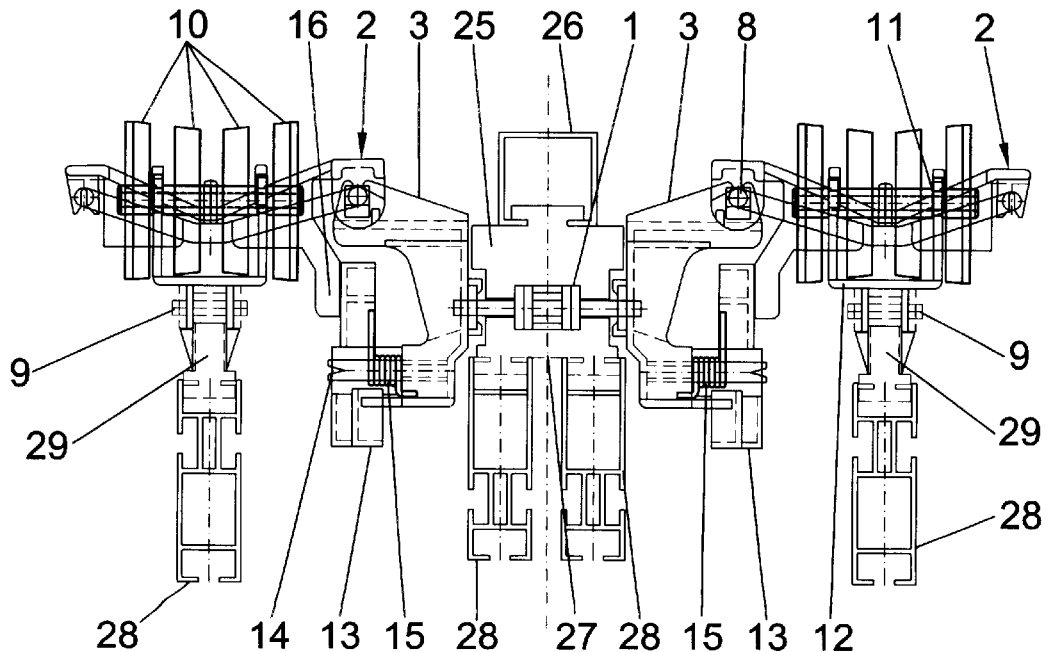
FIG. 3 represents another cross-section view of the center conveyor chain assembly and the two side conveyor chains. This cross-section view corresponds to the front area of the conveyor, where the groups of rotating cylindrical elements and supports are alternately combined, in such a way that the fruit pieces may rest on two consecutive groups of rotating cylindrical elements allowing to detect any flaw in the fruit pieces.
Figure 4:
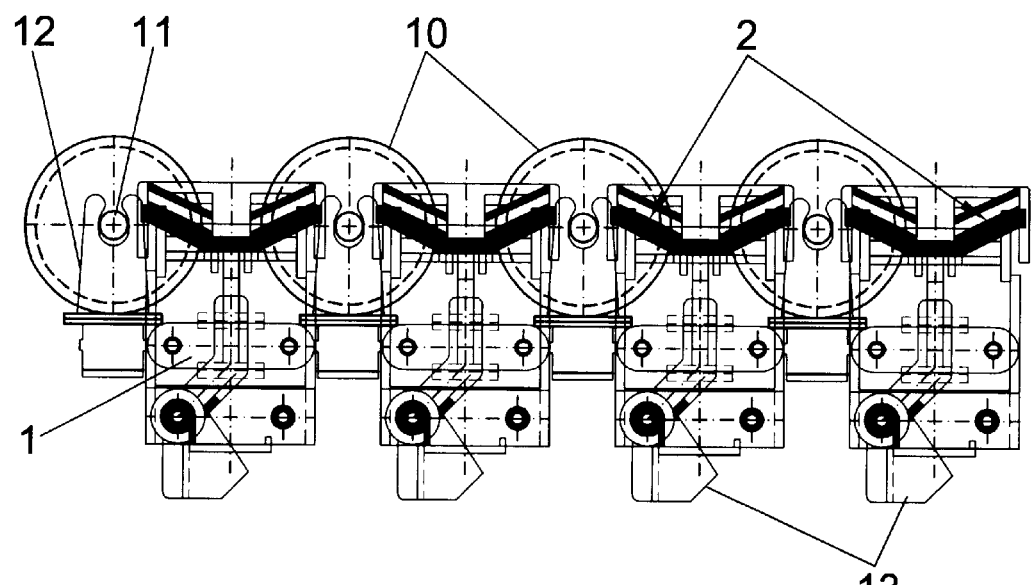
FIG. 4 represents a raised view of the front part of the conveyor where the rotating cylindrical elements and the tiltable supports are combined.
Figure 5:
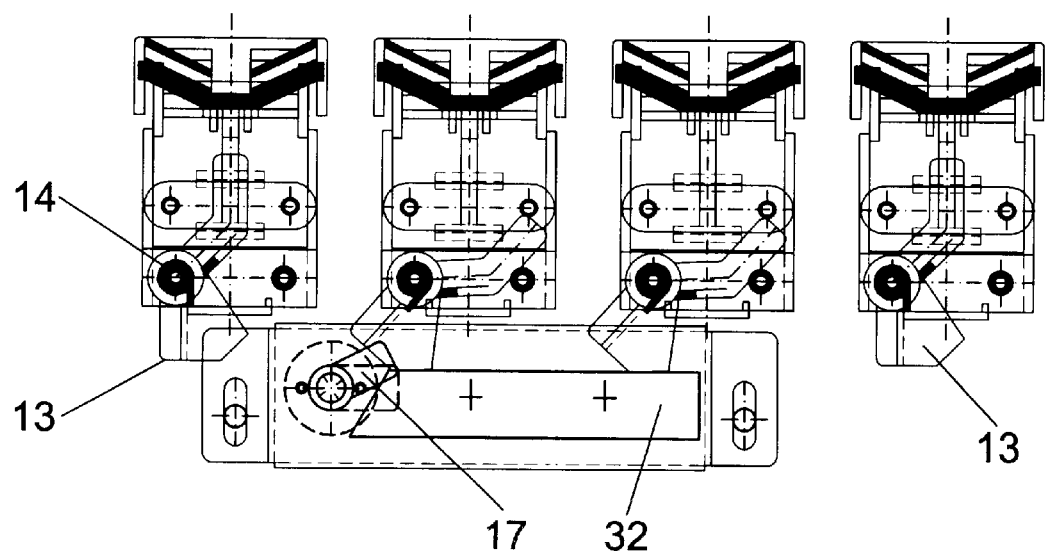
FIG. 5 represents a raised view of the tiltable supports, as well as a guide with which the supports are associated by means of a lever in order to proceed to the overturning or collapsing downward in order to unload the fruit pieces.
Figure 6:
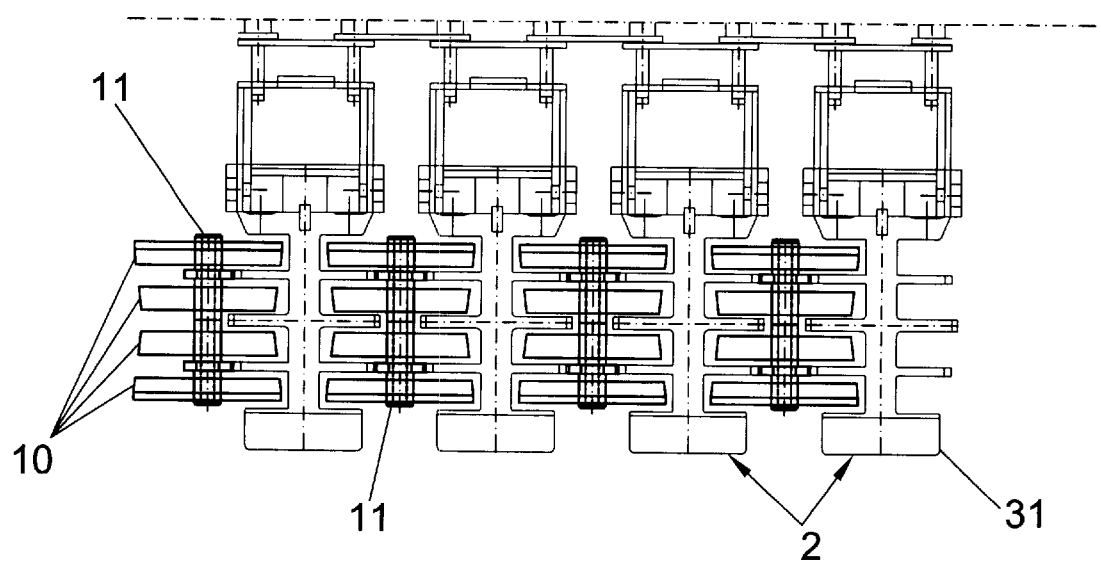
FIG. 6 represents a plan view of that which has been represented in FIG. 4.
Figure 7:
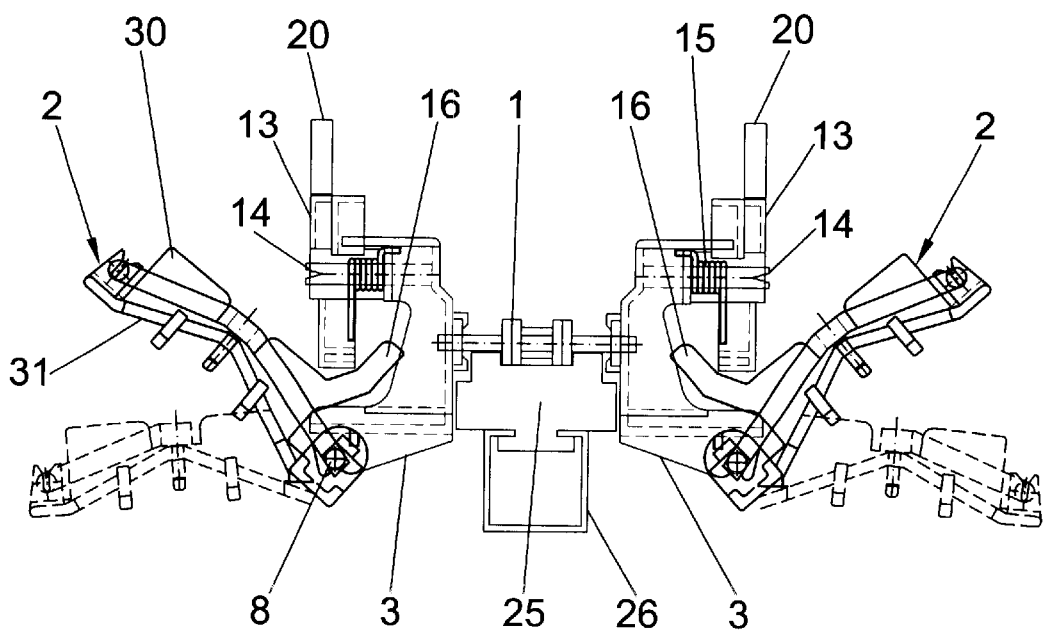
FIG. 7 represents a cross-section view of the assembly of the bottom branch of the center conveyor chain. In this branch, the tiltable supports are turned downward and they are placed in their initial position by means of a fixed elongated abutment.

The weighing station (6) includes a plurality of elongated front shoes (18) where the tiltable levers (13) of the supports (2) contact for the purpose of releasing the support of the extensions (16) of the cited tiltable supports (2) during the short space of time that the weighing lasts. During this short space of time, the support (2) with the piece of fruit (4) rests on a conventional weighing device (19) (FIG. 2). After carrying out the weighing, the tiltable lever (13) recovers its initial position by means of the spring (15), since said lever (13) ceases contacting with the respective elongated shoe (18) and therefore, the tiltable support (2) will again abut against said lever (13) to maintain its stability until it reaches the unloading station (7), where the lever or latch (13) will swivel by means of the electromagnet (17), in such a way that in this case, the support (2) tilts downward unloading the piece of fruit (4), said support (2) afterwards remaining tilted downward, until the lever (13) contacts once again with an elongated bottom shoe (20) located in correspondence with the bottom branch of the center conveyor chain (1). In this case, when the lever (13) contacts with the elongated bottom shoe (20) the extension (16) of the support (2) that was abutting against the inside of the lever (13) is released, the support thus recovering its initial position by gravity, in such a way that when the lever (13) ceases contacting with the bottom shoe (20), the lever also recovers its inoperative position by means of the spring (15), whereby the support (2) will again rest by its extension (16) on the lever (13) during advance of the center conveyor chain (1).

The center conveyor chain (1) is coupled on a plurality of end sprockets: a front one (21) and a rear one (22) which is the one that produces the traction.

On the other hand, the side conveyor chains (9) are also coupled to front sprockets (23) coupled to a coaxial shaft with the front sprocket (21) of the center conveyor chain (1) and rear sprockets (24) established approximately in an intermediate area of the center conveyor chain (1).

The top branch of the center conveyor chain (1) is guided between two tubular profiles: a first outside profile (25) fastened to a longitudinal beam (26), also with a tubular structure, and an inside profile (27) fastened to two support profiles (28), the top branch resting on the inside profile (27).

On the other hand, the bottom branch of the center conveyor chain (1) rests and is guided on a second outside tubular profile (25) integral to a tubular longitudinal beam (26).

On the other hand, the side conveyor chains (9) are guided during their run on a plurality of narrow profiles (29) integral to a plurality of support profiles (28) like the ones of the center conveyor chain (1).

The tiltable supports (2) comprise a bottom piece (30) articulated to the intermediate piece (3) by means of a shaft (8) and another top piece (31) where the pieces of fruit rest. This top piece comprises a structure defined by a longitudinal branch and various cross branches.

On the other hand, each one of the electromagnets (17) carries out a rotation in order to produce the swiveling of a latch (13) in order to empty the respective tiltable support (2) that contains the piece of fruit (4), in such a way that the electromagnet (17) will recover its initial position instantly before the following tiltable support assembly arrives so that said electromagnet (17) is prepared to make the following latch (13) swivel.

After each electromagnet (17) there is an elongated shoe (32) in order to keep the latch (13) collapsed during a space of time in order to better facilitate the removal and unloading of the fruit piece (4), in such a way that during this space of time, the latch (13) rests and is guided on the elongated shoe (32).

Finally, it should be pointed out that the tiltable support (2) is in turn the device on which the weighing (FIG. 2) is carried out and the device that tilts downward in order to remove the fruit.

What is claimed is:

1. An improved conveyor for the selection of fruit, comprising:
    a loading station;
    a weighing station provided with a weighing device;
    a fruit unloading station;
    a plurality of conveyor chains that comprise a plurality of support means and seat means for conveying pieces of fruit, the support means and seat means comprising a fruit unloading mechanism;
    the conveyor further comprising
    a center conveyor chain with a front part and a rear part, the center conveyor chain having two sides each of which is provided with a plurality of intermediate pieces where an alignment of supports for supporting and conveying fruit pieces is aligned, said supports having a tiltable structure that tilts downward to unload the fruit pieces being supported thereon, whereby weighing of the fruit pieces is carried out by means of the tiltable supports since the fruit pieces come to rest directly and dynamically on the weighing device during a short space of time;
    two side conveyor chains located in the front part of the center conveyor chain arranged underneath the tiltable supports of the center conveyor chain, being provided with a plurality of forks to house cross shafts that support a plurality of groups of rotating rollers and discs, the rotating cylindrical elements being alternately combined with the tiltable supports, said tiltable supports being at a slightly lower level with respect to the groups of rotating cylindrical elements;
    and wherein the center conveyor chain and the side conveyor chains are coupled to a plurality of end sprockets, comprising front sprockets and rear sprockets,
        the front sprockets of the center conveyor chain and the front sprocket of the side conveyor chains being coupled to a shaft in the front part of the center conveyor chain,
        the rear sprocket of the center conveyor chain is located in the rear part of the center conveyor chain
        the rear sprockets of the side conveyor chains are located in an intermediate area located between the front part and the rear part of the center conveyor chain.

2. An improved conveyor, according to claim 1, wherein each tiltable support comprises:
    a bottom piece articulated to the intermediate piece by means of a shaft and
    a top piece, the pieces of fruit resting on said top piece.

3. An improved conveyor, according to claim 1, wherein the unloading mechanism comprises:

a tiltable latch articulated to a fixed element integral to the intermediate pieces and a spring coupled to said fixed element for placing the latch towards an inoperative position each tiltable support abutting against said tiltable latch by means of a bottom extension of said tiltable support when the tiltable support is in an inoperative stable position.

4. An improved conveyor, according to claim 3, wherein the conveyor further comprises a tiltable electromagnet which acts against the latch during advance of the center conveyor chain making each tiltable support cease abutting against a top part of the respective latch so that each tiltable support tilt downward to unload a fruit piece.

5. An improved conveyor, according to claim 1, further comprising an elongated front shoe that is contacted by the tiltable latch during a short space of time for weighing fruit pieces.

6. An improved conveyor, according to claim 1, further comprising an elongated bottom shoe arranged in correspondence with a bottom branch of the center conveyor chain so as to position the tiltable supports in their initial inoperative position when the tiltable latch contacts on said elongated bottom shoe.

7. An improved conveyor, according to claim 1, wherein the center conveyor chain comprises a top branch and a bottom branch, the top branch being guided between a first outside profile and an inside, the bottom branch being guided on a second outside profile, the inside profile being integral to two support profiles the first outside profile and the second outside profile being integral to respective longitudinal beams.

8. An improved conveyor, according to claim 1, wherein the two side conveyor chains are guided on a plurality of narrow profiles integral to a plurality of support profiles.

* * * * *